United States Patent [19]
Tracer

[11] 3,803,913
[45] Apr. 16, 1974

[54] APPARATUS FOR DETERMINING HEAT-TRANSFER RATES AND THUS THE FLOW RATES OR THERMAL CONDUCTIVITIES OF FLUIDS

[76] Inventor: Jay Tracer, 451 Esther St., Costa Mesa, Calif. 92626

[22] Filed: Jan. 4, 1971

[21] Appl. No.: 103,367

Related U.S. Application Data

[63] Continuation-in-part of Ser. No. 52,684, July 6, 1970, abandoned, which is a continuation of Ser. No. 712,709, March 13, 1968, abandoned.

[52] U.S. Cl. .................................................. 73/204
[51] Int. Cl. ............................. G01f 1/00, G01p 5/00
[58] Field of Search.......................... 73/189, 204, 362

[56] References Cited
UNITED STATES PATENTS

| | | | |
|---|---|---|---|
| 2,552,017 | 5/1951 | Schwartz et al. | 73/204 |
| 2,650,496 | 9/1953 | Middleton et al. | 73/204 |
| 2,972,885 | 2/1961 | Laub | 73/204 |
| 3,485,009 | 12/1969 | Tollins | 73/204 |
| 3,147,618 | 9/1964 | Benson | 73/204 |
| 3,603,147 | 9/1971 | Dorman | 73/204 |

FOREIGN PATENTS OR APPLICATIONS

| | | | |
|---|---|---|---|
| 1,224,069 | 9/1966 | Germany | 73/204 |
| 1,199,030 | 8/1965 | Germany | 73/204 |

*Primary Examiner*—Herbert Goldstein
*Attorney, Agent, or Firm*—Smyth, Roston & Pavitt

[57] ABSTRACT

A thermistor bridge circuit and method in which a sensing thermistor generates a square wave having a varying duty cycle, such wave providing an accurate indication of the rate of heat transfer from the sensing thermistor to the ambient region, such rate of heat transfer varying with factors including the flow rate of fluid in the ambient region and the thermal conductivity of such fluid. In the preferred embodiment, an external control circuit is provided to maintain the frequency constant, and effects turn-on of the bridge whereas the bridge turns itself off. The width of each pulse is modulated in response to both (*a*) heat transfer and (*b*) the temperature of the sensing thermistor. The amplitude of each pulse is modulated in response to only the temperature of the sensing thermistor, and in such manner as to neutralize the effects of (*b*). The area of each pulse therefore varies only in accordance with heat transfer, and such area is indicated by a galvanometer. One of the two factors (voltage and current) representing power is maintained constant, so that the remaining one of the two factors will indicate the power which is supplied to the sensing thermistor in order to maintain it at a predetermined temperature differential above ambient. One embodiment incorporates a bridge which is self-oscillating, whereas the bridge in the above-indicated preferred embodiment is not self-oscillating since the control circuit is employed to turn on the bridge.

30 Claims, 16 Drawing Figures

PATENTED APR 16 1974

INVENTOR.
JAY TRACER
BY Jansewig & Carr
ATTORNEYS.

Fig. 8.

Fig. 9a. FLUID-NO FLOW TEMPERATURE $T_1$
Fig. 9b. FLUID-FLOW TEMPERATURE $T_1$
Fig. 10a. FLUID-NO FLOW TEMPERATURE $T_2$
Fig. 10b. FLUID-FLOW TEMPERATURE $T_2$

INVENTOR.
JAY TRACER
ATTORNEYS.

APPARATUS FOR DETERMINING HEAT-TRANSFER RATES AND THUS THE FLOW RATES OR THERMAL CONDUCTIVITIES OF FLUIDS

CROSS-REFERENCES TO RELATED APPLICATIONS

This application is a continuation-in-part of Patent application Ser. No. 52,684, filed July 6, 1970, now abandoned, for Apparatus and Method for Determining Heat-Transfer Rates and Thus the Flow Rates or Thermal Conductivities of Fluids. Such application is a continuatiuon of Pat. application Ser. No. 712,709, filed Mar. 13, 1968, now abandoned, for Apparatus and Method for Determining Heat-Transfer Rates and Thus the Flow Rates or Thermal Conductivities of Fluids.

BACKGROUND OF THE INVENTION

1. Field of the Invention

This invention relates to the field of heat-transfer measurement. More specifically, the invention relates to the field of devices and methods for measuring the rates of flow of fluids, or the thermal conductivities of fluids.

2. Description of the Prior Art

The prior art includes various thermistor bridge arrangements, namely Wheatstone bridges including sensing thermistors and temperature-compensating thermistors, for determining fluid flow rates. Exemplary of these are King U.S. Pat. No. 2,726,546, Bennett U.S. Pat. No. 2,947,938 and Yerman U.S. Pat. No. 3,085,431. The King and Yerman patents describe some of the basic laws which make it possible to measure fluid flow.

The prior art also includes German Patent Nos. 1,199,030 and 1,224,069. Such German Patent No. 1,224,069 teaches the use of a bridge as an oscillator to generate square-wave pulses the frequency of which depends on flow velocity, and further teaches the counting of such pulses to determine flow.

Prior-art bridges known to applicant are characterized by major deficiencies and disadvantages the most important of which is inability to operate accurately and satisfactorily over a wide range of ambient temperatures. Among other major disadvantages of various prior-art bridges are: (a) inability to be mass produced economically by relatively unskilled labor, (b) inaccuracy and/or instability, (c) difficulty and/or expense of measuring the power supplied to the sensing thermistor, (d) inability to operate properly in liquids, (e) insensitivity to small changes in heat transfer, (f) inability to use the same mass-producible circuit in different types of gases and liquids with only minor component variations, (g) self-heating of the temperature-compensating thermistor, (h) excessive usage of power, (i) necessity of heating the sensing thermistor to an impractically high temperature, and (j) inability to operate properly at various flow conditions without resorting to sampling of the flow or indirect heating of the sensing thermistor. In addition, it should be emphasized that devices employing hot wires are subject to the effects of corrosion, stress, etc., since the hot wires are not encapsulated in glass. Thus, it is very desirable that the method and apparatus be capable of using thermistors.

SUMMARY OF THE INVENTION

In accordance with both embodiments of the present invention, a sensing thermistor is supplied with sufficeint electrical power to maintain it at a predetermined temperature differential above ambient. The electrical power is supplied in the form of a series of pulses of the two factors (current and voltage) which determine power, one of such two factors being maintained constant throughout the duration of each pulse. The width (duration) of each pulse is modulated in response to the rate of transfer of heat out of the sensing thermistor, and also in response to the temperature of the sensing thermistor. Stated otherwise, the duty cycle is varied in accordance with heat-transfer rate and thermistor temperature. The height (amplitude) of each pulse is modulated in response to the temperature of the sensing thermistor, to compensate for the temperature-resonsive pulse-width modulations and thereby cause the area of each pulse to vary only in response to heat transfer. Such area is then employed, preferably by a galvanometer, as a measure of the power which must be supplied to the sensing thermistor. This is a measure of heat transfer and factors (such as flow, density, thermal conductivity, etc.) which affect heat transfer.

In the preferred embodiment, maximum accuracy, and maximum mass-producibility for use in various gases and liquids, are achieved by maintaining constant the frequency of the series (wave) of pulses. A thermistor bridge, incorporating (in one of its legs) the sensing thermistor and the galvanometer, is turned on by an external source of fixed freqency, and is turned off in response to the condition of the bridge. Since the bridge cannot turn itself on, but must await each pulse from the fixed-frequency external source, the frequency of the pulses supplied to the sensing thermistor is constant. Thus, the only factor determining the reading of the galvanometer is the area of the pulse, and this varies only in response to heat transfer.

Description of the First Embodiment (FIGS. 1–7, inclusive)

Figure 1:
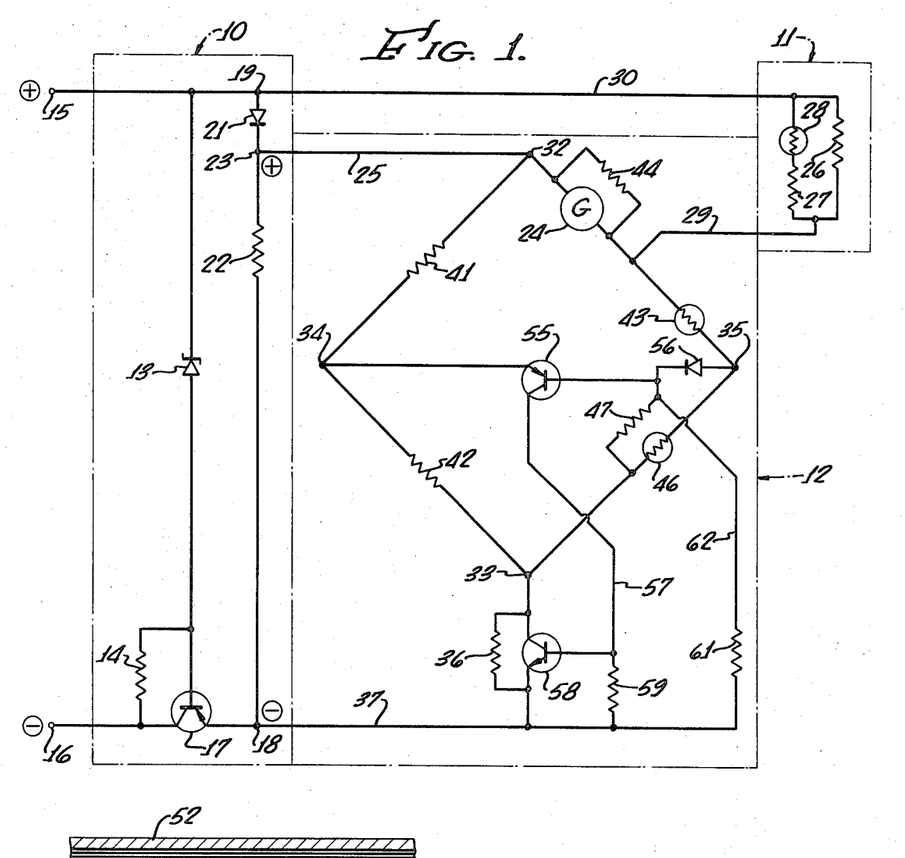
FIG. 1 is a schematic representation of one form of thermistor bridge circuit incorporating the present invention.

Referring to FIG. 1, the illustrated circuit comprises a power supply 10, a zero-suppress circuit 11, and the thermistor circuit 12. Circuits 10 and 11 will first be briefly described, following which the circuit 12 will be described in detail.

Power supply 10, which is adapted to supply a constant voltage to bridge circuit 12, may comprise a zener diode 13 which is connected in series with a biasing resistor 14 between the positive terminal 15 and a negative thermal 16 of a suitable D.C. power source. The anode of diode 13 is connected not only to resistor 14 but also to the base of a suitable PNP transistor 17. The emitter of transistor 17 is connected to a circuit point 18, whereas the collector of such transistor 17 is connected to resistor 14 and also to negative terminal 16. The cathode of the zener diode 13 is connected not only to positive terminal 15 but to a circuit point 19, there being a diode 21 and resistor 22 arranged in series relationship between such point 19 and the above-indicated circuit point 18.

The junction of circuit point 23 between diode 21 and resistor 22 is the fixed-voltage positive power-supply point to the Wheatstone bridge incorporated in circuit 12. Conversely, circuit point 18 is the fixed-voltage negative power-supply point for such bridge and an associated dropping resistor. The voltage between points 23 and 18 is substantailly constant because of factors including the cooperative action of zener 13 and transistor 17, the latter being provided in emitter-follower relationship and having the Wheatstone bridge in its emitter circuit. Such voltage may be, for example, nine and one-half volts. The voltage between circuit points 19 and 23 is determined by diode 21 and may be, for example, one-half volt, this assuming that the voltage between points 19 and 18 is ten volts as determined by the zener circuit. Diode 21 serves as a substantially fixed-voltage power supply to the zero-suppress and temperature-compensating network 11 described below.

The bridge incorporated in circuit 12 includes a current-measuring device and (more specifically) a d'arsonval galvanometer 24. Bridge current flows through the galvanometer at all times, even when there is no movement of the fluid to be measured. The zero-suppress cuicuit 11 effects flow through meter 24 of a current which is opposite in direction to the bridge current and has such a value that meter 24 will read zero when the particular fluid being measured is static. This assumes that the device is employed as a flowmeter, it being understood that for other uses of the present apparatus and method the meter 24 may be caused to read when the surrounding fluid is static.

zero-suppress circuit 11 is illustrated to comprise a parallel network of two resistors 26 and 27, the latter being in series with a thermistor 28. The junction of resistors 26 and 27 is connected through a lead 29 to galvanometer 24, the other side of such galvanometer being connected through the bridge-input lead 25 to circuit point 23. The junction between resistor 26 and thermistor 28 is connected through a lead 30 to circuit point 19.

Because there is a voltage drop (for example, one-half volt) across diode 21, a current will flow from circuit point 19 through lead 30, resistor network 26–28, lead 20, galvanometer 24, and lead 25 to circuit point 23. The values of elements 26-28 are empirically selected in such manner that galvanometer 24 will read zero when there is no flow in the medium in which the bridge thermistors are immersed, and over the entire temperature range to which the present circuit is to be subjected. The thermistor 28 is not normally caused to contact the medium to be tested, being instead incorporated in the housing (not shown) along with the remaining circuitry.

It is emphasized that circuits 10 and 11 are only exemplary of various ones which could be employed. For example, the zero-suppressing of galvanometer 24 could be achieved by mechanical means.

DESCRIPTION OF CIRCUIT 12

The Wheatstone bridge incorporated in circuit 12 has input terminals 32 and 33, and output terminals 34 and 35. Input terminal 32 is connected through lead 25 to the positive circuit point 23. Input terminal 33 is connected through a dropping resistor 36 to a lead 37 which is connected to negative circuit point 18. The dropping resistor 36 lowers the voltage impressed across bridge input terminals 32 and 33 to a relatively low value except when such resistor 36 is shorted or shunted as will be described subsequently.

The bridge leg between points 32 and 34 incorporates a bridge resistor 41, whereas the leg between points 34 and 33 incorporates a bridge resistor 42.

The bridge leg between points 32 and 35 incorporates, in series relationship, the galvanometer 24 and a sensing thermistor 43. It is emphasized, however, that the resistance of thermistor 43 is greatly in excess of that of galvanometr 24, so that the bridge leg 32–35 may be regarded as consisting of the thermistor 43 only. In those instances when the galvanometer 24 does not have a sufficiently low resistance, it may have associated therewith a shunt resistor 44 of suitably low value.

The remaining leg of the bridge, between points 35 and 33, is formed by a temperature-compensating thermistor 46. The resistance value of such thermistor 46 is sufficiently low, in comparision to that of a tracking and compensating resistor 47 associated therewith, that the resistance of leg 35-33 may be regarded as consisting only of the resistance of thermistor 46.

The that 41, 42, 43 and 46 are so constructed and related that various objectives will be achieved. One such objective is that there will be no substantial self-heating of either thermistor 43 or 46 when the dropping resistor 36 is in the circuit (not shorted out). Another such objective is that when the dropping resistor 36 is shorted out the sensing thermistor 43 will be self-heated a substantial amount (by passing of current therethrough), whereas the temperature-compensating resistor 46 will again not be self-heated. Thus, the resistance of thermistor 46 will be responsive substantially entirely to the temperature of the medium to which it is exposed.

Another objective is that the thermistors 43 and 46 will "track" with each other, that is to say change resistances at the same rate, in response to changes in ambient temperature. Thus, when the resistance of thermistor 43 doubles due to lowering of ambient temperature from a first value to a second value, the resistance of thermistor 46 should also double due to lowering of the ambient temperature from such first value to such second value. If, in order to achieve production economies, the thermistors 43 and 46 do not track precisely with each other, the tracking error may be minimized through connection of the resistor 47 (having an appropriate and empirically-determined value) in shunt with thermistor 46. Also, as will be discussed hereinafter, the thermistor 46 and/or resistor 47 are made such that the degree of tracking will be changed in a desired manner resulting in frequency compensation.

The relationship between elements 41, 42, 43 and 46 is also sufficiently in such manner that the temperature of thermistor 43 will be a predetermined number of degrees above that of thermistor 46. Thus, since thermistor 46 is at ambient temperature, and since the bridge is close to balance (as described below), a predetermined temperature differential (relative to ambient) will exist. Such temperature differential may be, for example, 35 degrees F. The differential should not be excessively high because the thermistor 43 should not heat the surrounding medium and thereby result in convective flow of fluid with consequent erroneous flow indications. Also, the temperature of thermistor 43 should not be so high as to require an excessive power consumption. On the other hand, it is desired that the differential be sufficeintly high that any tracking errors between thermistors 43 and 46 will not result in serious inaccuracies.

A further and critical objective determining the relationship between the various resistors 41, 42, 43 and 46 is that the circuit will operate in a switching mode, to generate a pulsing and substantially square-wave signal as distinguished from a continuous output. Thus, for example, the relationship should be such that when power is initially supplied to input bridge terminals 32 and 33 the bridge will be unbalanced to thereby result in conduction in an associated sensing transistor as will be described hereinafter.

One satisfactory relationship between resistors 41 and 42 is that resistor 41 have a value three times that of resistor 42. For such values of resistors 41 and 42, thermistors 43 and 46 may have, respectively, values of 500 ohms and 50 ohms when they are relatively cold (25° C.). Accordingly, after power is applied to the bridge and when dropping resistor 36 is shunted, thermistor 43 will be heated unitl its resistance reduces to a value only three times that of thermistor 46, thereby causing the bridge to become balanced One typical relationship between sensing thermistor 43 and temperature-compensating thermistor 46, when the same are employed in a flow-determining device, is represented schematically in FIG. 6. The thermistor 43 is seen to be potted in glass 50 which projects into a flow passage within a pipe 52. Thermistor 46 is potted in material 53 which extends through the wall of pipe 52, and in which the base or inner portion of the glass 50 is embedded.

Figure 6:
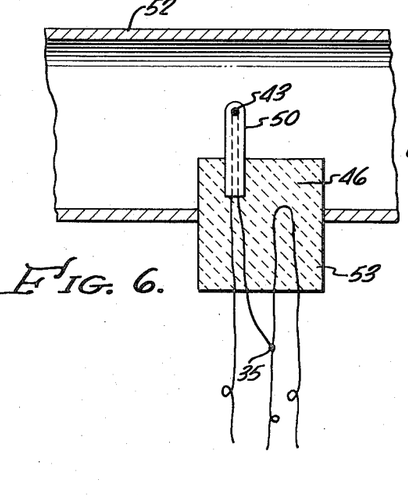
FIG. 6 is a schematic representation of a suitable relationship between the thermistors and a pipe containing fluid the flow rate of which is to be determined.

The sensing thermistor 43 is in heat-transfer relationship with the medium in pipe 52 but is not in heat-transfer relationship with the temperature-compensating thermistor 46. Compensating thermistor 46 is so related to the medium in pipe 52 that it will assume the temperature of such medium.

It is pointed out that thermistor 43 is small and thermistor 46 large, this accounting in part for the fact that thermistor 43 heats substantially in response to current flow therethrough whereas thermistor 46 does not. Such size differential is only exemplary, however, it being possible to cause the thermistors to be of relatively equal size provided that the thermistor 46 is so constructed that no substantial self-heating results. A further reason for the self-heating of sensing thermistor 43 is that the three-to-one resistance ration between bridge resistors 41 and 42 means that the power in thermistor 43 will be substantially three times that in thermistor 46.

Preceeding next to a description of the transistors and other important elements associated with the bridge, a transistor 56, which may be referred to as a sensing and control means, is connected between bridge output terminals 34 and 35. More specifically, transistor 55 is a PNP transistor the emitter of which is connected to terminal 34 and the base of which is connected through a diode 56 to terminal 35. The collector of transistor 55 is connected through a lead 57 to the base of a second transistor 58 and also, via a resistor 59, to negatve lead 37.

The second transistor 58 is illustrated as being an NPN and is adapted when in conduction to short out the dropping resistor 36 as previously indicated. Thus, such resistor 36 is connected in shunt with the emitter and collector of transistor 58, so that the emitter-collector circuit of the transistor extends between bridge input terminal 33 and negative lead 37.

It should be noted that, by making appropriate changes, the transistor 55 could be an NPN, and transistor 58 a PNP. Also, in certain instances the two bridge thermistors may be changed in location. Thus, for example, sensing thermistor 43 may in some cases replace compensating thermistor 46, compensating thermistor 46 then replacing resistor 42 which is shifted to the previous location of thermistor 43. Appropriate circuit changes are then made, such as placing galvanometer 24 in the same bridge leg as the sensing thermistor.

Because thermistor 43, when it is cold, has a higher ratio (such as ten-to-one) to thermistor 46 than the ratio (three-to-one) of resistor 41 to resistor 42, the voltage at terminal 35 will initially be more negative than that at terminal 34. Stated otherwise, the voltage at point 35 is intially dropped ten-elevenths of the potential from point 32 to point 33, whereas the voltage at point 34 is intially dropped only three-fourths of the potential from point 32 to point 33. It follows that the base of transistor 55 is intially negative relative to the emitter thereof, so that transistor 55 turns on and creates a circuit from plus terminal 23 through lead 25, resistor 41 transistor 55, lead 57 and resistor 59 to negative lead 27. The resulting current flow in resistor 59 causes the base of transistor 58 to be positive relative to the emitter thereof, so that such transistor (being an NPN) will turn on and short out the dropping resistor 36.

It is emphasized that when there is no current flowing through resistor 59, the base emitter potentials of transistor 58 are the same, so that such transistor is not in conduction and does not short out the dropping resistor 36. The cooperative action of transistors 55 and 58 in causing dropping resistor 37 to be first in and then out of the circuit, in response to the voltage between bridge output terminals 34 and 35, will be described in detail subsequently.

The remaining element in the circuit 12 is a resistor 61 which is connected between negative lead 37 and a junction point between tracking resistor 47 and the cathode of diode 56 (the anode of diode 56 being connected to terminal 35). Resistor 61, the value and operation of which will be discussed in detail hereinafter (relative to diode 56), creates a circuit from positive terminal 23 through lead 25, galvanometer 24, thermistor 43, terminal 35, diode 56, and a lead 62 through resistor 61 to negative lead 37.

It is highly desirable and frequently necessary that transistor 55 be a silicon transistor although, for some applications, a germanium transistor will suffice. The diode 56 should be a silicon diode, as will be discussed hereinafter, being in opposition to the emitter-base junction of silicon transistor 55. The diode 56 and its associated resistor 61 play very important roles relative to factors including the frequency of oscillation of the circuit, as will be described. It is also pointed out that diode 56 forms part of a shunting circuit from terminal 35 through tracking and compensating resistor 47 to the side of thermistor 46 adjacent terminal 33.

DESCRIPTION OF THE METHOD, AND OF ADDITIONAL IMPORTANT CIRCUIT RELATIONSHIPS

Let it be assumed that the circuit is to be emplyed as a flowmeter, it being a feature of the invention that the present circuit may (with only minor calibrating adjustments, and with appropriate changes in component values) accurately measure the flow not only of gases but also of liquids.

In the absence of flow (for example, through the pipe 52 of FIG. 6), the amount of heat transferred from sensing thermistor 43 to the surrounding medium is a linear function of the temperature differential therebetween. The heat transfer is not a function of the absolute temperature of either the thermistor or the medium, but only of the differential. Thus, if the temperature differential is doubled, the rate of heat transfer is doubled.

The rate of heat transfer from sensing thermistor 43 to the surrounding medium in response to flow is a nonlinear function of the rate of flow. Thus, it would be possible to draw a curve correlating the rate of flow through pipe 52 to the rate of heat transfer from thermistor 43. Such curve would be drawn at a fixed temperature differential, so that only flow would be indicated. It is pointed out, however, that such curve need not be drawn since the galvanometer 24 may be calibrated to indicate flow directly. Furthermore, by employing additional appropriate circuitry, the reading of the galvanometer 24 may be made linear.

By maintaining the Wheatstone bridge in substantially balanced condition at all times, and measuring the amount of electrical power which must be supplied to sensing thermistor 43 in order to maintain the temperature therof at a fixed, predetermined differential relative to the temperature of the flowing medium (and of compensating thermistor 46), it is possible to determine (as by use of meter 24) the rate of heat transfer and thus the rate of flow. This is because the heat transferred from thermistor 43 to the medium is necessarily supplied by the heat generated (self-heating) due to the power fed into such thermistor 43. Since the temperature differential is maintained fixed, as will be described, the meter reading indicates flow only.

Prior to the present invention, the probelm of accurately and economically measuring the electrical power supplied to the sensing thermistor was a major one. The present invention solves the problem by causing the bridge to generate substantially square-wave electrical oscillations the duty cycle of which varies in response to the heat transferred from thermistor 43, and then measuring the average or integrated value of such oscillations. More specifically, each oscillation or pulse is caused to have the same magnitude and duration when the ambient conditions (temperature, type of medium and flow rate) are constant. As will be described subsequently, when the flow rate increases (at a constant temperature) the mangitude of each pulse stays the same but the duration changes, that is to say the duty cycle (the proportion of percentage of time the oscillatory wave is at maximum condition) is altered. When the temperature changes, at a constant flow rate, the pulse magnitude changes in one direction but the pulse duration changes in the opposite direction, the relationship between such changes being such that the average or integrated value remains constant so that flow is accurately measured.

The illustrated embodiment of the present invention comprehends maintaining the upper and lower squarewave voltage levels (impressed across sensing thermistor 43) constant at all times, and measuring the average values of the current pulses flowing through the thermistor as a result of the applied voltage wave. The duty cycles of both the voltage wave and the current wave are caused to be functions of the rate of cooling of thermistor 43, and thus the rate of flow.

It is also within the scope of the present invention to maintin a constant current flow through thermistor 43 (that is to say, a square-wave current having fixed peak and valley levels), and to measure the average values of the resulting voltage pulses, thereby again producing an indication of power in a simple, accurate and economical manner. This may be accomplished by appropriate circuitry including a constant-current power source.

The above principles may best be understood by a specific illustration of the method (the constant-voltage embodiment). Let it be assumed, for example, that the fluid present in pipe 52 is water and is initially stagnant. Let is also be assumed that the water temperature remains constant, the operation for a different water temperature being explained hereinafter.

Figure 2A:
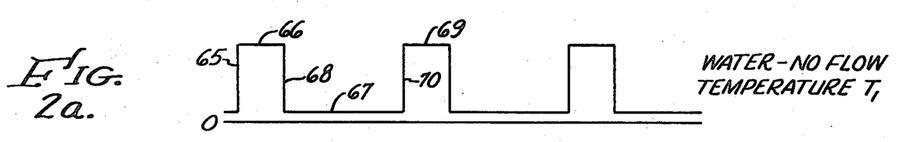
FIGS. 2–5, inclusive, illustrate typical current waves for various flow, no-flow and temperature conditions in the embodiment of FIG. 1.

Upon application of a fixed D.C. voltage (such as nine and one-half volts) to positive and negative circuit points 23 and 18, respectively, current flows downwardly through the various elements 41, 42, 43 and 46 to shunting or shorting transistor 58. The flow is through transistor 58 to negative lead 37, instead of through the dropping resistor 36, since (as explained above) the bridge is initially unbalanced which causes both transistors 55 and 58 to saturate. Because dropping resistor 36 is thus effectively out of the circuit, being shorted, the total impedance between points 23 and 18 is greatly reduced to result in relatively high current flows in all legs of the bridge. The current then flowing through sensing thermistor 43 may be, for example, that indicated at 66 in FIG. 2a, such figure being a plot against time of current flowing through thermistor 43 when immersed in stagnant water. The rapid increase in current, to the level 66, is indicated at 65.

Since, as above stated, the current level 66 is sufficient to heat the thermistor 43 to the predetermined temperature differential above the temperature of the medium (water), the resistance of thermistor 43 decreases until its resistance ratio relative to that of thermistor 46 is on the order of three-to-one (for example, in the stated illustration). Thereupon, the bridge output terminals 34 and 35 are caused to have substantially equal voltages which eliminates the forward bias on transistor 55 to cause the same to turn off. Accordingly, as stated above, current flow through resistor 59 terminates and causes transistor 58 to cease to conduct, so that dropping resistor 36 is not longer shorted.

The total impedance present between circuit points 23 and 18 is thus greatly increased, resulting in decreased current flows in all bridge legs, the current flow through sensing thermistor 43 then being that indicated at 67 in FIG. 2a. It is a feature of the invention that the drop in current level from 66 to 67 occurs very suddenly, as indicated at 68, because of the degenerative action described below.

Because the current level 67 is insufficient to cause self-heating of thermistor 43, such thermistor transfers its heat to the stagnant water and therefor cools. The cooling of the thermistor 43 causes the bridge to again become unbalanced, turning on the sensing and control transistor 55 and thus the shunting transistor 58. The resulting greatly increased current flow in thermistor 43 is represented at 69, and is caused by regnerative action occurring at region 70. The described oscillatory cycle then repeats.

It is pointed out that the lapsed time between regions 68 and 70 is relatively large, this being due to the fact tht the water is stagnant and therefore is not particularly effective in cooling the thermistor 43.

Figure 2B:
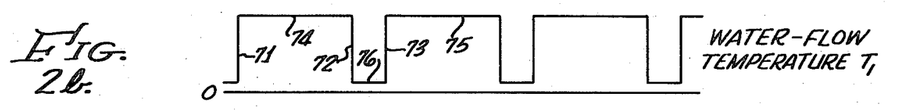

Referring next to FIG. 2b, which corresponds exactly to FIG. 2a except that it represents the condition wherein the water in pipe 52 is flowing at a predetermined constant rate, the operation is the same except that the time required to heat the thermistor 43 sufficiently to balance the bridge is much longer, being that elapsed between regions 71 and 72. Conversely, the time required to cool thermistor 43 and thereby unbalance the bridge is much shorter, being that elapsed between regions 72 and 73. The relatively high current in thermistor 43 when the bridge is unbalanced is represented at 74 and 75 relative to the first two pulses or bursts of current, whereas the low current flowing when the bridge is balanced is represented at 76.

When the bridge is balanced, the voltage at point 35 is at a predetermined fixed differential relative to the voltage at point 32. It follows that all of the low-level (valley) currents 67, 76, etc., will have the same magnitudes. Stated otherwise, the magnitude of each low-level current 67, 76, etc., will be constant due to the fact that when the bridge is balanced there is a predetermined and fixed low-level voltage impressed across thermistor 43 between points 32 and 35.

It is a feature of the present invention that the operation of the bridge is such that it remains close to the balance point even when in unbalanced condition. Accordingly, the high-level voltage at point 35 (during bridge unbalance) also does not vary substantially from pulse to pulse, which means that the magnitudes of peak current levels 66, 69, 74 and 75, etc., will be constant. Because dropping resistor 36 is shorted during intervals when the bridge is unbalanced, the voltage differential between points 32 and 35 is much greater than when the bridge is balanced. The square-wave voltage oscillates between fixed levels, as does the resulting square-wave current.

By comparing FIGS. 2a and 2b it will be seen that the only difference relates to the duty cycle. The wave of FIG. 2a has a relatively short or low duty cycle because the duration of each high-level current 66, 69, etc., is relatively brief. The wave of FIG. 2b has a relatively long or high duty cycle because each high-level pulse 74, 75, etc., is of extended duration. It will now be demonstrated that the increase in the duty cycle, responsive to flow through the pipe 52, is a highly accurate indication of the power transferred from thermistor 43 to the medium and thus of the rate of fluid flow.

Figure 7:
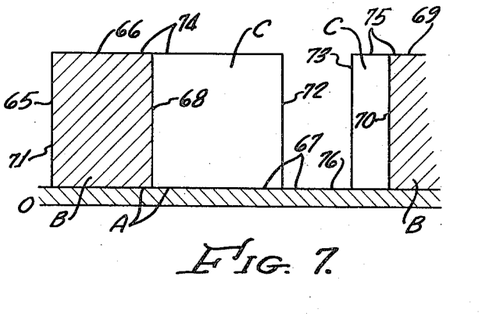
FIG. 7 illustrates the curves of FIGS. 2a and 2b in superimposed relationship.

Referring to FIG. 7, the left portions of the curves of FIGS. 2a and 2b are shown superimposed on each other, the scale being double that of such FIGS. 2a and 2b. In addition, a continuous horizontal line A is drawn coincident with the low-level current portions 67, 76, etc., such low-level current portions having the same magnitudes as above stated. The space between horizontal line A and the zero axis (abscissa) is hatched in one direction. The areas above the horizontal line A and forming part of each pulse of FIG. 2a are hatched in the opposite direction and are designated B. The areas above line A and representing the increase of the pulses of FIG. 2b over the pulses of FIG. 2a are not hatched and are labeled C. It is to be noted that the pulses of FIG. 2b extend over, or overlap, the pulses of FIG. 2a, over the indicated areas B.

Because of the operation of the zero-suppress circuit 11, which produces in galvanometer 24 a reverse current flow sufficiently high to prevent the same from reading during the stagnant condition of FIG. 2a, it follows that all of the hatched portions of FIG. 7 are canceled and produce no reading on the meter. The only thing which produces a meter reading is, therefore, the increased curve portions C of FIG. 7, these being an accurate representation of power due to the fact that the magnitude of the square-wave voltage across thermistor 43 is substantially constant at all times.

Such combination of varying duty cycle with a constant applied voltage results in an accurate, simple, commercially-producible flowmeter far in advance of any prior-art circuit. It is emphasized that prior-art circuits are grossly deficient relative to one or both of the following (and other) factors: (a) They do not measure the electrical power supplied to the sensing thermistor and thus transferred therefrom, despite the fact that power measurement constitutes the only meaningful and commercially practical indication of rate of flow, or (b) they measure power in a commercially impractical way, as by a wattmeter or other expensive device. The present invention measures power, but requires only a simple voltmeter or ammeter, this being possible because one or the other of voltage and current is maintained constant.

If there were no switching, but instead fluctuations, it would not be possible or practical to measure power with an ammeter or voltmeter, because voltage and current would change simultaneously. Assume, for example, that (in a prior-art non-switching device) the voltage across the sensing thermistor drifts down from 8 volts to 4 volts, and that the resistance of the sensing thermistor is 200 ohms. The current (voltage divided by resistance) would necessarily change from 40 milliamps to 20 milliamps, and the power (voltage times current) from 320 milliwatts to 80 milliwatts. Thus, power is only one-fourth, but each of voltage and current is one-half. It follows that a measurement of only voltage or current is meaningless. Also, because resistance changes with temperature, the computation of power by external circuitry is commercially impractical.

If, in a prior-art non-switching circuit, either of voltage or current is maintained constant, the other will also remain constant since resistance is fixed at any given temperature. The meter needle will thus be fixed and produce no reading.

For high accuracy, the voltage and current waves of the present invention should be as close to square as possible. Otherwise, voltage and current will vary simultaneously, and (by analogy to prior-art non-switching circuits) produce erroneous indications of power. However, for some applications there may be considerable deviation from a square wave.

The present circuit produces a clean square wave because of the regenerative-degenerative action next to be stated. The regenerative action which effects rapid turn-on of transistors 55 and 58 (curve portions 65, 70, 71 and 73 of FIGS. 2a and 2b) results from the fact that when transistor 55 starts to turn on (as the bridge approaches the unbalanced condition) the effective resistance of transistor 58 (from collector to emitter) starts to drop, which in turn commences to create a shorting path around dropping resistor 36. It follows that the voltage impressed across the Wheatstone bridge will commence to increase, thereby increasing the error voltage across the emitter-base of transistor 55. The cycle then repeats, with transistor 55 conducting more and more current, which then turns on transistor 58 harder and harder, which in turn shunts out dropping transistor 36 progressively more effectively, which in turn increases the error voltage causing turn on and eventual saturation of transistor 55. All this occurs in an extremely brief period of time, such as less than a microsecond.

The degenerative action (curve portions 68, 72, etc., of FIGS. 2a and 2b) is the reverse of the regenerative action. Thus, as the bridge approaches the balanced condition the voltage difference between the emitter and base of transistor 55 becomes progressively smaller and smaller until such transistor 55 starts to turn off. This, in turn, starts to effect turn off of transistor 58, thus increasing the resistance of the shorting path around dropping resistor 36, thus starting to reduce the voltage impressed across the bridge, thus reducing the error voltage across the emitter-base junction of transistor 55, etc.

Figure 3A:
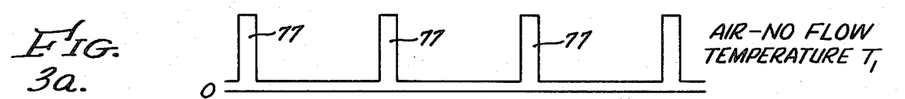
Figure 3B:
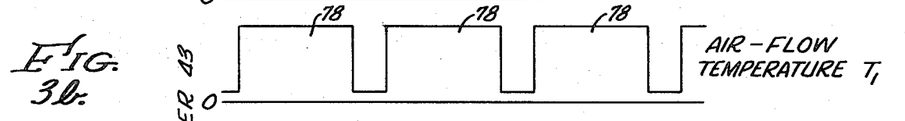

Referring next to FIGS. 3a and 3b, the illustrated square-wave currents respectively correspond to FIGS. 2a and 2b except that the medium in pipe 52 is air instead of water. At the no-flow condition, FIG. 3a, the pulses 77 are short because air permits much more rapid self-heating of the sensing thermistor 43 by the current of predetermined magnitude. The pulses 78 of FIG. 3b represent the flow condition, the rate of flow not necessarily being the same as that represented by FIG. 2b relative to water.

As previously indicated, the circuit is calibrated for each medium. Thus, the zero-suppress circuit 11 is caused to be such that at the no-flow condition of FIG. 3a there will be no indication on the meter 24. Also, the circuit is calibrated relative to each medium in such manner as to achieve the optimum oscillations.

The above discussion relative to FIGS. 2 and 3 has assumed that the temperature of the medium remained constant. There will now be discussed the temperature-compensation operation whereby the meter reading indicates flow only, being substantially unaffected by temperature over a wide temperature range.

The operation of the circuit is such as to maintain the temperature of sensing thermistor 43 at a predetermined differential above the temperature of compensating thermistor 46. This is because, as described above, thermistor 43 is self-heated substantially due to passage of current therethrough when the bridge is unbalanced, whereas compensating thermistor 46 is not self-heated substantially at any time and is therefore responsive solely to the temperature of the medium in pipe 52.

Because compensating thermistor 46 is at the same temperature as the medium, and because the sensing thermistor 43 is at a predetermined temperature differential relative to thermistor 46, it follows that the sensing thermistor 43 will remain at a predetermined temperature differential relative to the medium. This constant temperature differential between thermistor 43 and the medium is, as stated above, what maintains constant the heat-transfer rate to the medium relative to all factors except flow, so that changes in such heat-transfer rate (and thus in the amount of power which must be supplied to maintain the temperature of thermistor 43) indicate flow only.

Let it be assumed that the curves of FIGS. 2 and 3 were made when the temperature of the medium was $T_1$, and that the curves of FIGS. 4 and 5 were made relative to a condition when the temperature of the medium was much higher, being designated $T_2$. Let it also be assumed that the temperature difference between $T_1$ and $T_2$ is such that the resistance value of thermistor 43 is cut in half, as is the resistance value of thermistor 46 since such thermistors substantially track with each other as stated above.

The bridge will be balanced or unbalanced at temperature $T_2$ the same as at $T_1$, since the ratio of the resistances of thermistors 43 and 46 is all that matters. However, as stated, the resistance value of sensing thermistor 43 has been halved. The voltage between points 32 and 35 is the same at temperature $T_2$ as at temperature $T_1$, being (in the stated example) one-third the drop between points 32 and 33. The power necessary to heat thermistor 43 to the necessary temperature differential is also the same at temperature $T_2$ as at temperature $T_1$.

Since the power necessary to effect heating of thermistor 43 to the desired temperature differential is the same, and since the resistance of thermistor 43 has been cut in half, and since power equals the square of voltage divided by the resistance, it follows that the requisite power will be supplied during a time period which is half, at temperature $T_2$, the time period necessary at temperature $T_1$. Also, since the voltage is the same but the resistance has been cut in half, the current at temperature $T_2$ will be double that at temperature $T_1$.

Figure 4A:
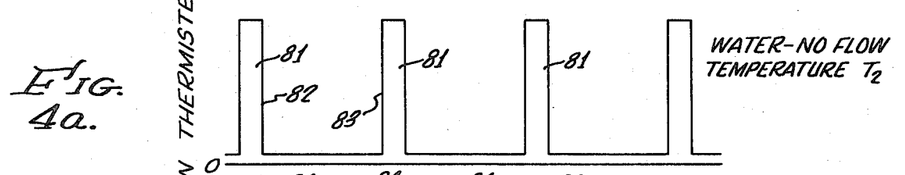
Figure 4B:
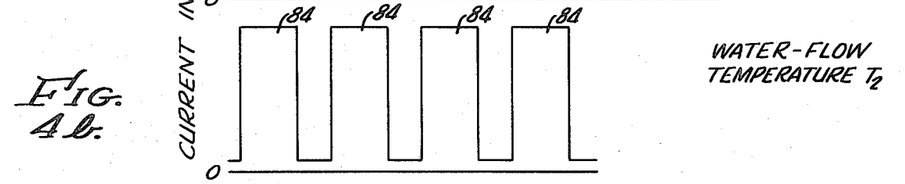

FIG. 4a corresponds exactly to FIG. 2a except that the temperature is $T_2$ instead of $T_1$. It follows that each pulse 81 of FIG. 4a has a duration only half as long as the corresponding pulse of FIG. 2a, but has a magnitude twice as great as the corresponding pulse of FIG. 2a. Although the pulses in FIG. 4a are shorter (lesser duration) than in FIG. 2a, the cooling interval between pulses is the same since this depends entirely upon temperature differential. Thus, the distance between lines 82 and 83 in FIG. 4a is the same as the distance between lines 68 and 70 in FIG. 2a. Relative to FIG. 4b, this corresponds exactly to FIG. 2b except that the water is flowing at temperature $T_2$, not $T_1$. Thus, the pulses 84 of FIG. 4b will be twice as high but half as wide as those of FIG. 2b.

Because of the averaging nature of the d'arsonval meter 24, it produces substantially the same reading for the curve of FIG. 4b as for that of FIG. 2b. Similarly, the zero point will be substantially the same relative to the curve of FIG. 4a as for that of FIG. 2a, so that the zero-suppress circuit 11 operates at all temperatures within the range of operation of the device. Stated in another manner, the d'arsonval meter 24 does not "know" whether the pulse passed therethrough has a magnitude "a" and a duration "b", or has a magnitude $2a$ and a duration $\frac{1}{2}b$, the area of the pulse being the same in either case.

The only difference between the readings of FIG. 2 and those of FIG. 4 relates to the fact that the pulses of FIG. 4 are closer together, being narrower than in FIG. 2, so that there are more pulses in FIG. 4 in a predetermined time period than in FIG. 2. The error resulting from such frequency variation is compensated for, and minimized, within the operating range of the instrument. As an example, compensation may be achieved by maintaining the medium stagnant while varying the temperature thereof throughout the operating range. The compensating thermistor 46 and/or resistor 47 are then caused to be such that the meter reading will remain at zero over the operating range. It follows that the meter reading under flow conditions will indicate flow only. Compensation is also effected by resistor 61, as stated hereinafter.

Figure 5A:
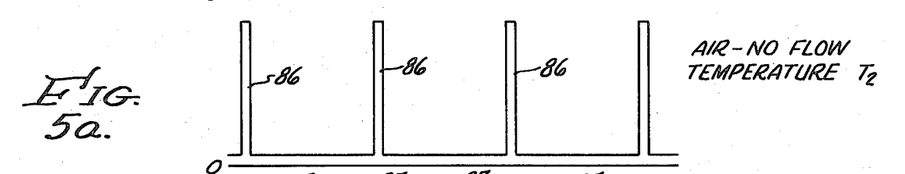
Figure 5B:
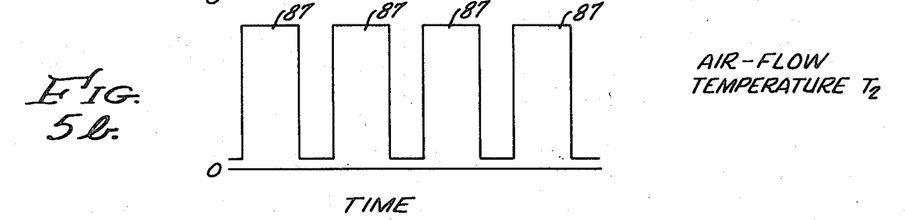

FIG. 5a corresponds exactly to FIG. 3a except for the indicated temperature difference. Thus, each pulse 86 of FIG. 5a is twice as high and half as wide as each pulse 77 of FIG. 3a. Correspondingly, each pulse 87 of FIG. 5b is twice as high and half as wide as each pulse 78 of FIG. 3b.

It will thus be seen that the width (duration) of each pulse changes, for each particular medium, in response to only two factors, namely: (a) The rate of heat transfer from the sensing thermistor 43 to the medium, and (b) the temperature of the sensing thermistor 43. Stated otherwise, the duty cycle changes (for each medium) only in response to such factors (a) and (b). On the other hand, the height (amplitude) of each pulse changes (for each medium) in response to factor (b) only, not factor (a). The changes in pulse height and pulse width in response to factor (b) are such as to neutralize or cancel out each other, in that the area of each pulse remains the same regardless of temperature. Thus, the area of each pulse responds only to factor (a), and this is what produces the changes in the reading of averaging meter 24.

It is pointed out that the present method and circuit operate properly even when both flow (heat transfer) and temperature change simultaneously, the area of each pulse being solely dependent upon flow. It is possible to produce a condition whereby the duty cycle is the same at two different flow rates, but the height of each pulse is different because of temperature change. Even in this unusual circumstance, the pulse area is solely dependent upon flow.

In embodiments wherein the current passed through sensing thermistor 43 is maintained constant, as indicated heretofore, the areas of the resulting voltage pulses vary in response to heat transfer only, not temperature. Let it be assumed, for example, that the temperature change is such as to reduce the resistance of thermistor 43 to one-half its previous value. Since current is constant, the voltage across the thermistor will likewise be reduced one-half, as will the power applied to the thermistor. Since power is reduced one-half, the bridge will be in its "on" condition for a time period twice as long, in order to effect the requisite heating. Thus, the pulse area is independent of temperature.

In contrast to the teaching of German Patent No. 1,224,069. it is not desired that pulse frequency change at all. Any changes in pulse frequency are undesirable in that error is introduced, and such error must be compensated for. The embodiment of FIGS. 8–10, described below, maintains the pulse frequency constant and thus introduces no error. In the method taught by German Patent No. 1,224,069, the frequency changes with temperature, thus producing error since pulse frequency is what is being read out.

OPERATION OF DIODE 56 AND ITS ASSOCIATED RESISTOR 61

As previously indicated, it is highly desirable that the sensing and control transistor 55 be a silicon transistor. The use of a silicon transistor provides much greater ranges of operating temperature with stability, greatly facilitates temperature compensation, and makes it practical to employ the present instrument relative to not only gases but also liquids. However, a silicon transistor is characterized by a turn-on voltage (which must be developed between the emitter and base of transistor 55) which is a number of times higher than the turn-on voltage for a germanium transistor. For example, the turn-on or error voltage for a germanium transistor may be 200 millivolts, whereas that for a silicon transistor may be 600 millivolts.

The indicated increase in error voltage, when a silicon transistor is employed, creates major problems relative to many applications of the instrument. If the required error voltage is large, the Wheatstone bridge must shift far off the balanced condition before triggering or change of state occurs, which means that a substantial time will be required for the sensing thermistor 43 to heat or cool the requisite amount each cycle. It follows that the frequency of operation will be relatively low, and may be so low that the needle of galvanometer 24 pulses or vibrates instead of appearing to remain at a steady level. Conversely, if the bridge is close to being balanced, the frequency of operation will be relatively high and the meter needle will not vibrate. Also, and very importantly, if the bridge is close to balance the voltage across thermistor 43 will be relatively constant (at one level when transistors 55 and 58 are on, and at another level when they are off, as above indicated). This permits a highly accurate representation of power and accordingly of rate of flow.

In accordance with one aspect of the present invention, the emitter-base voltage drop of transistor 55 is compensated for as by means of the diode 56 and the associated biasing resistor 61. The current path through the diode 56 is from positive circuit point 23 through galvanometer 24, thermistor 43, diode 56, and biasing resistor 61 to negative lead 37 and thus negative circuit point 18. The voltage drop across the diode 56, which is the result of flow of current through the stated path, is relatively (but not absolutely) constant despite changes in current. The polarity is such that bridge terminal 35 is positive with respect to the base of transistor 55. However, since the diode and transistor junctions are in opposition, as indicated by the arrows which face each other, the base of transistor 55 is negative with respect to the emitter thereof. It follows that when the diode 56 is appropriately selected and biased, the error or turn-on voltage of the transistor 55 is compensated for so that there is the requisite turn-on voltage across the transistor even when the bridge is balanced (that is to say, when the voltages at points 34 and 35 are substantially equal).

Where the transistor 55 is a silicon one, the voltage developed across the diode 56 may be (for example) on the order of 0.5 or 0.6 volt. Where the transistor 55 is germanium, the voltage across the diode may be on the order of 0.2 volt.

Although the diode 56 or equivalent thereof is exceedingly important for many applications, it may be omitted in some instances as in applications where the transistor 55 is germanium. The diode 56 may be replaced by a zener diode, etc., or even a battery although the latter is much less practical.

The combination of diode 56 and resistor 61 is important in determining the oscillation frequency of the circuit. Thus, although the voltage drop across diode 56 is relatively constant despite changes in current flow, there is a small amount of variation. Therefore, changing the value of biasing resistor 61 alters slightly the voltage drop across the diode 56, which in turn alters the error or turn-on voltage which is sensed by the transistor 55, which in turn changes the frequency of oscillation. Accordingly, the value of resistor 61 is so set that the device will oscillate satisfactorily throughout the entire range of temperatures to which the thermistors 43 and 46 will be subjected.

The value of resistor 61 is also so set that the needle of meter 24 will not pulse or vibrate throughout the operating range of temperatures. In addition, resistor 61 and other factors are so set that the square wave generated by the circuit will be clean, by which it is meant, for example, that the high-level current portions (such as 66, 69, 74 and 75 in FIGS. 2a and 2b) will be substantially horizontal instead of sloping. Also, the setting is made such as to minimize any error due to temperature-caused frequency deviation.

It might be thought that the diode 56 could be omitted, even when the transistor 55 is silicon, by causing the low-level currents (such as 67 and 76 in FIGS. 2a and 2b) to be relatively high and thereby increasing the error voltage. This could be accomplished by making the dropping resistor 36 relatively low in value. It is emphasized, however, that it is desired that the low-level currents 67 and 76 be of low magnitude because this substantially prevents self-heating of sensing thermistor 43 when the bridge is balanced, as is desired for highly accurate operation of the circuit. It is desired that the thermistor 43 only heat when the bridge is unbalanced, that is to say when the transistors 55 and 58 are on. The diode 56 permits the dropping resistor 39 to be large, with consequent low-level currents when the transistors are off, while still permitting the bridge to operate accurately in the desired frequency range.

Although the biasing current path through diode 56 also flows through thermistor 43, the amount of current flow through such thermistor is much lower where the diode 56 and resistor 61 are employed than would be the case if such elements 56 and 61 were omitted and an attempt made to achieve desired operation by greatly lowering the value of dropping resistor 36.

The value of bias resistor 61 is very much greater than the value of thermistor 43, thus minimizing the flow through thermistor 43 as desired. For example, resistor 61 may have a value of 22 kilohms whereas thermistor 43 may only have a value (when relatively cool) of 500 ohms. The value of dropping resistor 36 may be, for example, approximately 4 kilohms, this again being much higher than the value of thermistor 43 or even the combined value of thermistor 43 and thermistor 46. Because the dropping resistor 36 is also relatively large, as is desired, the current flowing through the thermistor 43 when transistors 55 and 58 are off is low as desired.

The diode 56 may be substantially perfectly matched to the transistor 55 by employing, in place of a conventional diode, the emitter and base terminals (the collector terminal being unconnected to anything) of a transistor which corresponds exactly to transistor 55.

In order to convert (as indicated above) from constant-voltage to constant-current operation, various changes would be made in addition to providing a constant-current power source. These would include, among others, providing resistor 36 and transistor 58 in series relationship with each other, such series combination being shunted across bridge terminals 32 and 33. In an application where temperature is constant, galvanometer 24 may (even in the described constant-voltage embodiment) be omitted and replaced by a voltmeter connected across thermistor 43.

A typical frequency of oscillation of the present device is 200 cycles per second.

As but one illustration of a vast number of uses of the present method and device in measuring flow of gases and liquids, the probe may be sufficiently small that it may be inserted through the wall of an artery of a human being in order to determine the rate of blood circulation through such artery. Because the temperature of the blood is substantially constant, the compensating thermistor 46 may in some cases be omitted from the probe, so that only the very small elements 43 and 50 need be inserted. Such thermistor 46 is then replaced by a resistor having the same value as thermistor 46 would have at a temperature of 98.6° F.

As another illustration of a use of the device, it may be a speedometer on a boat moving through a body of water. Where the water is a river, the zero-suppress network may be set in accordance with whether or not the vessel is moving upstream or downstream, in each case the setting being such that the galvanometer reads zero when the speed of the boat relative to ground is zero.

SPECIFIC EXAMPLE OF ONE FLOWMETER CIRCUIT, EMBODIMENT OF FIGS. 1–7

As a specific example, a circuit employed to measure flow of water over a temperature range of from 0° C. to 40° C. may utilize as sensing thermistor 43 a GD25J1, manufactured by Fenwal Electronics, Inc., of Framingham, Massachusetts, having a resistance value of 500 ohms at 25° C. Thermistor 46 may be a CB15J1, manufactured by Fenwal, having a resistance value of 50 ohms at 25° C. Thermistor 28 may be a KB21J1, manufactured by Fenwal, having a resistance value of 100 ohms at 25° C.

Transistor 55 may be a 2N1305, whereas transistor 58 may be a 2N1711. Transistor 17 may be a 2N1305. Diode 56 may be a 1N645. Diode 21 may be a 1N645, and zener diode 13 may be rated at 10 volts.

The applied D.C. voltage to circuit points 18 and 19 may be, as indicated above, 10 volts. Meter 24 may be rated at 100 microamperes, being any suitably damped microammeter.

The various resistors may have the following values:

Resistor 14 — 470 ohms
Resistor 22 — 1,000 ohms
Resistor 26 — 130 ohms
Resistor 27 — 100 ohms
Resistor 36 — 3,900 ohms
Resistor 41 — 3,000 ohms
Resistor 42 — 1,000 ohms
Resistor 44 — 10 ohms
Resistor 47 — 3,900 ohms
Resistor 59 — 47,000 ohms
Resistor 61 — 22,000 ohms

USES OF THE METHOD AND CIRCUIT FOR PURPOSES OTHER THAN MEASURING FLOW

As previously indicated, one important additional use of the method and circuit is in determining the thermal conductivities of various liquids and gases, under no-flow conditions or under conditions of predetermined flow. Let it be assumed, for example, that the device is calibrated for stagnant water, by appropriately adjusting factors including the zero-suppress circuit 11. Should the probe containing thermistors 43 and 46 then be immersed in another fluid, for example stagnant gasoline, the meter reading would be very different due to the difference in conductivity between water and gasoline. Other and different readings would be obtained for kerosine, alcohol, etc. It will thus be seen that the meter 24 may be calibrated to determine one liquid (or gas) from another. It may also be employed to determine the percentage mixture of two liquids since this will produce an intermediate thermal conductivity. Other uses of the device include, for example, measuring the pressure (or degree of vacuum) of a gas.

The d'arsonval galvanometer 24, or a d'arsonval voltmeter if the circuit is of the constant-current type, may be highly economical and rugged. This is to be distinguished from expensive and delicate wattmeters. For many applications of the invention, a simple and suitably damped ammeter or voltmeter will perform the requisite averaging function.

It is pointed out that the present apparatus and method are also highly useful in measuring mass flow through a given pipe. Such mass flow varies with both the pressure and velocity of a gas, for example. The meter may be calibrated directly in terms of pounds per unit of time.

Figure 8:
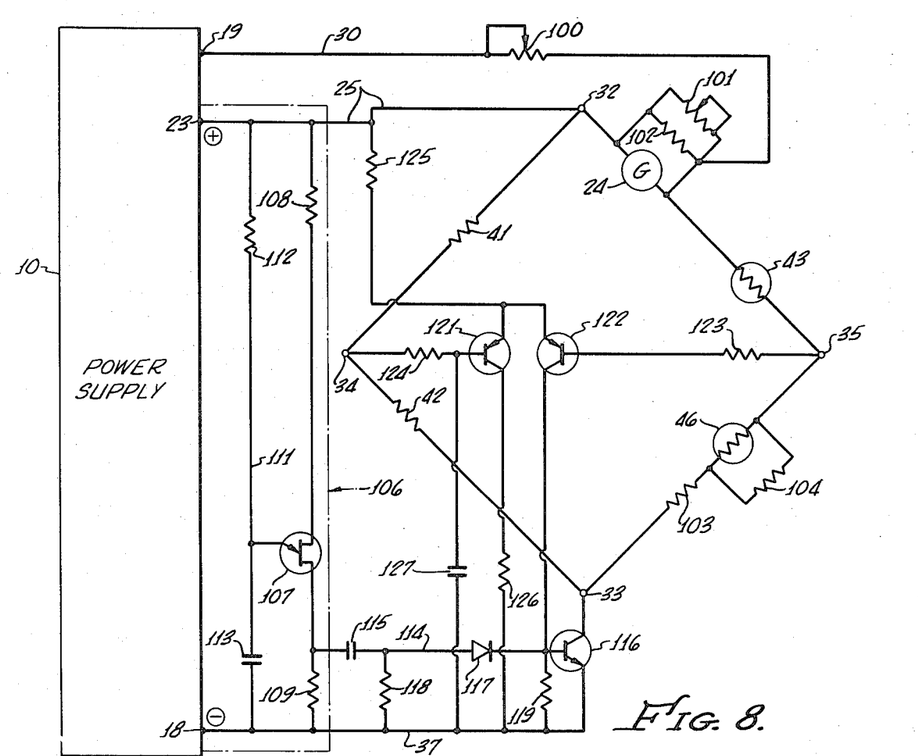
FIG. 8 is a schematic representation of a second embodiment of the thermistor bridge circuit.

DESCRIPTION OF THE PREFERRED EMBODIMENT (FIGS. 8–10, INCLUSIVE)

Except as specifically stated hereinafter, and except relative to components of the first embodiment which are omitted from the present embodiment, the circuitry and theory relative to the present embodiment are identical to what is described in detail above relative to the first embodiment.

The power supply 10, described in detail relative to the previous embodiment, may also be employed in the present embodiment. Such power supply has an output terminal 23 leading through positive lead 25 to one of the input terminals 32 of the bridge. The power supply also has a negative terminal 18 connected to a negative lead 37. Such negative lead extends to the other input terminal of the bridge, number 33, via a transistor described hereinafter. The bridge has output terminals 34 and 35, bridge resistors 41 and 42, and thermistors 43 and 46, as described relative to the previous embodiment.

The galvanometer 24 is connected in the bridge between points 32 and 35, in series with sensing thermistor 43. A lead 30, which is connected to power supply terminal 19 as described relative to the previous embodiment, forms part of a circuit adapted to zero-suppress the galvanometer 24 so that it reads when there is no flow. In the present embodiment, the adjustment for the zero-suppress function may be performed by a simple rheostat 100 interposed in the lead 30. A second rheostat, numbered 101, is connected in shunt across the meter 24 in order to adjust the scale thereof (make the meter read full scale). In addition, a low resistance 102 is shunted across the meter 24 to prevent variations of the meter reading with temperature. The resistance 102 may be a relatively long coil of copper wire having a low value such as, for example, six ohms. It is pointed out that, in the present embodiment, the zero-suppress means does not require a thermistor.

In the leg of the bridge which contains the temperature-compensating thermistor 46, series and shunt resistors are provided in order to cause the thermistor 46 to track more accurately relative to thermistor 43. The series resistor is indicated at 103, and the shunt resistor at 104. The values of these resistors are empirically determined to improve the tracking, there being (in the present embodiment) no requirement for frequency compensation.

In accordance with the present embodiment, and as previously indicated, the bridge is caused to operate at a fixed frequency, regardless of flow variations or temperature variations, thereby eliminating frequency-related errors and preventing the necessity of compensating for such errors. Stated more definitely, an external source is employed to determine frequency and operates to prevent any component of the bridge from having any bearing upon frequency. The resulting benefits include: greater temperature range of operation, greater accuracy, increased ease of converting from operation in a gas to operation in liquid, ease of mass production by relatively unskilled personnel, and other major benefits.

The external frequency-determining source or control is indicated at 106. The source 106 may be of various types adapted to generate a fixed-frequency series of short-duration pulses. Preferably, the pulses are spikes of extremely short duration.

The illustrated source or control 106 is a unijunction transistor oscillator incorporating the unijunction transistor 107. The bases of transistor 107 are connected, respectively, through a resistor 108 to positive lead 25, and through a resistor 109 to negative lead 37. The emitter of the unijunction transistor is connected to a lead 111 at the junction between a resistor 112 and a capacitor 113. The remaining terminal of resistor 112 connects to positive lead 25, whereas the remaining terminal of capacitor 113 connects to negative lead 37.

The resistor 112 and capacitor 113 cooperate with each other to determine the frequency of oscillation. Resistor 108 is a bias resistor, whereas resistor 109 is a load resistor.

The unijunction transistor oscillator operates, at a frequency determined by the values of elements 112 and 113, to supply to a lead 114 through a capacitor 115 a series of pulses (capacitor 115 being connected to the junction between resistor 109 and transistor 107). Each such pulse is positive and is adapted to effect turn-on of a transistor switch 116 which controls the application of electrical power to the entire Wheatstone bridge. As soon as the transistor 116 is operated to turn the bridge on, the bridge becomes operative to turn itself off at the end of the time period required to effect the requisite heating of sensing thermistor 43, and as described below.

Each positive pulse from oscillator 106 to transistor 116 passes through a diode 117 the anode of which is connected to capacitor 115 and the cathode of which is connected to the base of transistor 116, which is an NPN transistor.

A resistor 118, which is connected between negative lead 37 and the junction between capacitor 115 and diode 117, permits the capacitor 115 to discharge after each pulse and thus prepare for the next-succeeding pulse.

The collector of the transistor switch 116 is connected to input point 33 of the bridge, whereas the emitter of such transistor is connected to negative lead 37. A resistor 119 is connected between the base of transistor 116 and the lead 37, and operates to insure that the transistor 116 will not be forward biased but will instead be in "off" condition prior to application of a positive pulse from oscillator 106. Resistor 119 cooperates with another transistor, described below, to maintain the transistor 116 forward biased after termination of the pulse from the oscillator.

In the present embodiment, the sensing and control means associated with the output terminals 34 and 35 of the bridge, for sensing when the bridge is close to balance and providing a control function in response thereto, is a differential amplifier formed by two opposed PNP transistors 121 and 122. The base of transistor 122 is connected to bridge output terminal 35, through a resistor 123. The base of transistor 121 is connected to output terminal 34 through a resistor 124. The emitters of both transistors 121 and 122 are connected to positive lead 25 through an emitter resistor 125.

The collector of transistor 122 is connected to the junction between resistor 119 and the base of transistor 116. The collector of transistor 121 is connected through a collector resistor 126 to negative lead 37. A very low-value capacitor, numbered 127, is connected between lead 37 and the junction between resistor 124 and the base of transistor 121.

DESCRIPTION OF THE METHOD, AND OPERATION, EMBODIMENT OF FIGS. 8–10

Let it be assumed that the power supply 10 has been turned on but that the unijunction transistor oscillator 106 is initially in a period between pulses. Transistor switch 116 is then not forward biased and therefore not in conduction, which means that the entire Wheatstone bridge is deprived of electrical power. Thus, no current is flowing through any of the elements 41, 42, 43 and 46.

As soon as a positive pulse is supplied by oscillator 106 through capacitor 115 and diode 117 to the base of transistor 116, such transistor becomes forward biased (the base then being more positive than the emitter) and causes supply of power to the bridge from power supply through leads 25 and 37.

It is to be remembered that the value of bridge resistor 41 is (in the present illustration) approximately three times the value of resistor 42, whereas the value of thermistor 43 is (before the bridge is substantially balanced) many more times the value of thermistor 46. In the present circuit, the thermistor 43 may have a value of 200 ohms when the bridge is cold whereas the thermistor 46 may then have a value of 14 ohms. It follows that the voltage drop from point 32 to point 35 is, before the bridge is substantially balanced, much greater than the voltage drop from point 32 to point 34. Therefore, the base of transistor 122 is caused to be much more negative than is the base of transistor 121. The circuit values are so selected that the transistor 122 will then turn on whereas the transistor 121 will not then turn on.

As soon as transistor 122 turns on, it completes a circuit from power supply terminal 23 through lead 25, resistor 125, transistor 122 and resistor 119 to lead 37 and back to the power supply terminal 18. The resulting voltage drop across resistor 119 maintains the base of transistor 116 at a higher voltage than the emitter of such transistor, so that transistor 116 is latched on despite the fact that the pulse from oscillator 106 is of extremely short duration.

Because the transistor switch 116 is on, current flows through the bridge and causes self-heating of sensing thermistor 43 to a temperature such that the ratio between such thermistor and thermistor 46 is approximately the same as the ratio between resistor 41 and resistor 42, the bridge then being substantially balanced. The voltage at the base of transistor 122 thus progressively rises relative to the voltage at the emitter thereof until, finally, transistor 122 is no longer forward biased and therefore ceases to conduct. However, during the time the transistor 122 was in conduction, the voltage of the emitter of such transistor followed the voltage of the base thereof and therefore progressively rose. Since the emitters of the two transistors 121 and 122 are connected, the voltage of the emitter of transistor 121 also rose progressively. The result is that transistor 122 ceases to conduct substantially simultaneously with turn-on of transistor 121 (the latter turning on because the rise in voltage in the emitter thereof causes the same to be forward biased).

Although transistor 121 turns on, this is only momentary because the cessation of conduction of transistor 122 operates to turn off the transistor switch 116, there being no longer a voltage drop across resistor 119. The capacitor 127 maintains the transistor 121 in conduction for a very short time period, but a period which is sufficiently long to prevent racing of the transistors, to create a clean wave form and to eliminate undesirable transients.

The bridge is thus supplied with power during a time period which is dependent upon the time required for self-heating of sensing thermistor 43 to the predetermined temperature differential above ambient.

It is pointed out that when switch 116 is not in conduction, neither of the transistors 121 and 122 can be in conduction (except for the above-indicated very short holdover caused by the low-value capacitor 127). This is because the base connection to each of the transistors 121 and 122 is through the switch 116, and such connection is broken when the switch 116 is off. Although the capacitor 127 connects the base of transistor 121 to negative lead 37, this does not cause turn-on of such transistor, or cause maintenance of transistor conduction except for the indicated very short time period, due to the fact that the capacitor 127 does not pass direct current.

Figure 9A:
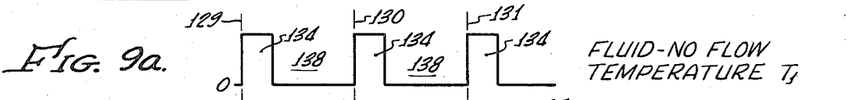
FIGS. 9 and 10 illustrate typical current waves for several flow, no-flow and temperature conditions in the embodiment of FIG. 8.

Referring next to FIGS. 9 and 10, waves are shown which correspond generally to the showings of FIGS. 2–5 but which relate to the constant-frequency embodiment of FIG. 8. In FIG. 9a a wave is shown wherein the sensing thermistor 43 is immersed in a stagnant fluid at a temperature $T_1$. The fluid may be any gas or liquid. Wave 9b corresponds to 9a except that the fluid is flowing. Wave 10a relates to a condition wherein the sensing thermistor 43 is immersed in a stagnant fluid at a different temperature, $T_2$, which is higher than temperature $T_1$ and which is such that the resistance of thermistor 43 is one-half that of the thermistor at temperature $T_1$. Wave 10b corresponds to wave 10a except that the fluid is flowing.

Figures 9B, 10A:
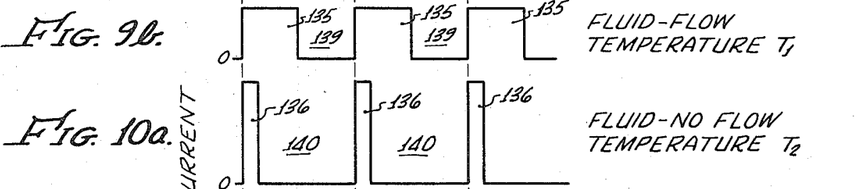
Figure 10B:
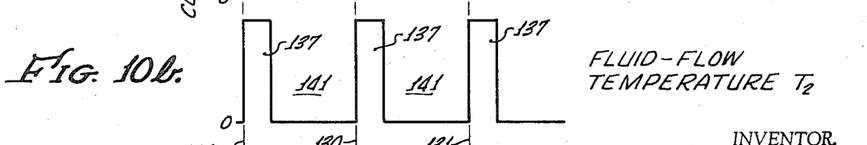

In the present illustration, the fluid is the same relative to all of waves 9a, 9b, 10a and 10b, and the rate of fluid flow relative to wave 9b is the same as the rate of fluid flow relative to the wave of FIG. 10b.

The vertical lines 129, 130 and 131 extend through all of FIGS. 9a, 9b, 10a and 10b and represent the pulses generated by the oscillator 106. Each oscillator pulse is extremely thin, a spike, and is (for example) about as wide as each vertical line 129–131.

It is pointed out that such oscillator pulse starts each of the square-wave pulses 134 in FIG. 9a, 135 in FIG. 9b, 136 in FIG. 10a, and 137 in FIG. 10b. Thus, although each of the pulses 134, 135, 136 and 137 has a different width (duration) and duty cycle, the pulse frequency is identical in all of the four waves. Thus, the inaccuracies which were introduced relative to the previous embodiment by variation in frequency, and which were compensated for within the operating range of the instrument, are eliminated in the present embodiment.

Each square-wave pulse 134, 135, 136 and 137 is present during the period commencing with the spike (129, 130 or 131) from the unijunction oscillator and ending when the transistor 116 switches off in response to substantial balance of the bridge resulting from self-heating of sensing thermistor 43 to the predetermined temperature differential above ambient. Conversely, the spaces 138–141 between the respective pulses 134–137 have different durations which vary in accordance with the widths of the pulses 134–137 and also in accordance with the frequency of the spikes (129–131) generated by oscillator 106. Thus, unlike the previous embodiment, the gaps between pulses are not dependent upon the cooling time of the sensing thermistor 43, but instead upon the stated factors.

Another difference relative to the previous embodiment is that the value of current, between adjacent pulses, is zero instead of some predetermined low level (such as is indicated at 67 in FIG. 2a). The current value is zero because the bridge is completely switched off between pulses, as described above. This minimizes consumption of power.

As described in detail relative to the previous embodiment, the area of each pulse 134 (FIG. 9a) is identical to the area of each pulse 136 (FIG. 10a). This is because of the stagnant conditions, because the fluid is the same in each instance, and because the difference between temperatures $T_1$ and $T_2$ is such as to cause the thermistor 43 to have a 50 percent lower resistance at $T_2$ than at $T_1$. Thus, the reading of the meter relative to FIGS. 9a and 10a will be identical in each instance, despite the difference in temperature. When the device is employed as a flowmeter, such meter reading will normally be set at zero by appropriate adjustment of the compensating rheostat 100. Such rheostat 100 creates a flow of current from point 19 through the galvanometer 24 and back to point 23 in a direction opposite to the flow of current from point 32 to point 35 and which is due to operation of the bridge. The specified opposing currents are caused to neutralize each other (when the instrument is employed as a flowmeter) at no-flow condition.

Similarly, the area of each pulse 135 in FIG. 9b is identical to the area of each pulse 137 in FIG. 10b. Thus, the meter 24 will read the same relative to both waves, since the fluid is the same and since the rate of flow is the same, despite the temperature difference.

Since the circuit through the bridge is substantially resistive in nature, the various series of current pulses shown in FIGS. 2–5 and 9–10 will be matched by corresponding series (not shown) of voltage pulses, each voltage pulse occurring substantially simultaneously with each corresponding current pulse. If substantial inductance or capacitance were introduced into the circuit, there would be a phase difference between the series of voltage pulses and the corresponding series of current pulses, but the above-stated theory of operation would still apply and the appended claims would not be avoided. The durations of the voltage pulses vary in correspondence with the durations of the current pulses, but the amplitudes of the voltage pulses are constant. In the constant-current forms (above indicated) of the invention, the amplitudes of the current pulses are constant whereas the amplitudes of the voltage pulses vary, the durations of the voltage and current pulses again varying in correspondence to each other.

The frequency of oscillation of the described circuit, being determined by the oscillator 106, may be varied (at the factory) over a wide range. A suitable frequency of oscillation is 2,000 Hz. The frequency of oscillation cannot be made so high that the pulses 134, 135, etc., touch each other since this results in essentially a D.C. condition. Preferably, because of practical considerations, the duty cycle should not exceed 50 percent. The frequency should not be made so low that the needle of meter 24 vibrates or pulses.

One of the major advantages of the present invention is that it performs accurately and satisfactorily even at very low flow rates, and despite extreme changes in the ambient temperature. Because (in the preferred embodiment) the frequency is constant, the instrument is easy to adapt (at the factory) for operation in liquid or in gas.

As indicated relative to the previous embodiment, the present method (embodiment of FIGS. 8–10) may be performed in the constant-current variable-voltage manner instead of in the described constant-voltage variable-current manner.

SPECIFIC EXAMPLE, EMBODIMENT OF FIGS. 8–10

As a specific example, a circuit employed as an anemometer to measure the flow of air over a temperature range of 0°C. to 50°C. utilizes as sensing thermistor 43 a GD22M2, manufactured by Fenwal Electronics, Inc., of Framingham, Massachusetts, and having a resistance of 200 ohms at 25°C. Thermistor 46 may be a KD11L7, also manufactured by Fenwal, having a value of 14 ohms at 25°C.

Transistor 116 may be a 2N3569, where each of transistors 121 and 122 may be a 2N3638A. The unijunction transistor 107 may be a 2N4871. The diode 117 may be a ITT600.

Capacitor 113 may have a value of 0.02 microfarads, capacitor 115 may have a value of 0.01 microfarads, and capacitor 127 may have a value of 100 picofarads.

The applied D.C. voltage between circuit points 18 and 23 may be 8.6 volts. Meter 24 may be rated at one milliampere, being any suitably damped milliammeter.

The various resistors may have the following values:

Resistor 41 — 3,000 ohms
Resistor 42 — 1,000 ohms
Resistor 100 — 50 ohms
Resistor 101 — 50 ohms
Resistor 102 — 6 ohms
Resistor 103 — 3.6 ohms
Resistor 104 — 30 ohms
Resistor 108 — 1,000 ohms
Resistor 109 — 56 ohms
Resistor 112 — 22,000 ohms
Resistor 118 — 22,000 ohms
Resistor 119 — 47,000 ohms
Resistor 123 — 1,000 ohms
Resistor 124 — 1,000 ohms
Resistor 125 — 1,500 ohms
Resistor 126 — 470 ohms

DEFINITIONS OF CERTAIN TERMS

The words "oscillation," "oscillations," etc., as employed in the present specification and claims, refer to either voltage or current. The words "square wave" include rectangular waves (and rectangular pulses). Such words as "wave," "oscillation," etc., apply despite the fact that in some instances (the embodiment of FIGS. 8–10) there are periods of zero current between pulses. Zero current, or zero voltage, is one of numerous current (or voltage) "levels."

As employed in the present specification and claims, such expressions as "average value," "integrated value," "average or integrated value," etc., refer to the areas of the pulses (as shown in FIGS. 2–5 and 9–10), which areas are determinative of the reading of meter 24.

The foregoing detailed description is to be clearly understood as given by way of illustration and example only, the spirit and scope of this invention being limited solely by the appended claims.

I claim:

1. An instrument for indicating heat-transfer rates, which comprises:

a Wheatstone bridge,
a sensing thermistor provided in one leg of said bridge between one terminal thereof and one adjacent terminal thereof,
first, second and third resistors respectively provided in the remaining three legs of said bridge,
the thermistor having a resistance value variable relative to the resistance values of the first, second and third resistances to provide the bridge with balanced and unbalanced conditions,
means to form an input circuit including said one bridge terminal and the bridge terminal opposite thereto,
said input circuit further including means providing at said sensing thermistor a voltage wave and a current wave, at least one of the waves characterized by changes between a fixed D. C. level and a datum level,
means to form an output circuit including said one adjacent bridge terminal and the bridge terminal opposite thereto,
said output circuit further including sensing and control means responsive to the condition of said bridge to change said one wave between said fixed D. C. level and said datum level, and
an averaging meter coupled to the sensing thermistor and responsive to the duty cycle of the other of the voltage and current waves present at said thermistor and providing an output indicative thereof to indicate the power dissipated by the sensing thermistor and hence the rate of heat transfer between said sensing thermistor and the fluid medium to which it is exposed.

2. The invention as claimed in claim 1, in which said sensing and control means provides the other of the voltage and current waves with characteristics for heating said sensing thermistor to a particular temperature which is a fixed differential above the temperature of the medium to which said thermistor is exposed, and for maintaining the temperature of the thermistor at substantially the particular temperature.

3. The invention as claimed in claim 1, wherein;
said sensing thermistor self-heats in response to said current wave to provide a varying resistance in the one leg of the bridge during periods when said one wave is at said fixed D. C. level, and said sensing thermistor does not self-heat substantially when said one wave is at the datum level, and said bridge is responsive to the varying resistance of the sensing thermistor to approach the balanced condition.

4. The invention as claimed in claim 1, in which said sensing and control means comprises a transistor responsive to the balanced condition of said bridge to change the one wave from the D. C. level to the datum level, the transistor having a turn-on voltage tending to inhibit a rapid change between the fixed D. C. levels and the datum level, and in which means is provided to neutralize substantially the turn-on voltage of said transistor thereby to maintain said bridge close to the balanced condition and to effect a rapid change between the fixed D. C. level and the datum level.

5. The invention as claimed in claim 1, in which said one wave is the voltage wave, and in which said meter is a d'arsonval galvanometer.

6. The invention as claimed in claim 1, in which means are provided in said output circuit to generate a compensating voltage which in conjunction with said sensing and control means maintains said bridge close to the balanced condition at all times.

7. The invention as claimed in claim 6, in which said sensing and control means includes a transistor providing an emitter to base voltage drop from the terminal opposite the one adjacent terminal to the one adjacent terminal, and in which said means to generate a compensating voltage includes a diode providing an anode to cathode voltage drop from the one adjacent terminal to the terminal opposite to the one adjacent terminal, whereby the anode to cathode voltage drop opposes the emitter to base voltage drop to effect rapid changes in the one wave between the D. C. level and the datum level.

8. The invention as claimed in claim 1, in which the resistor present in said bridge between said one adjacent terminal thereof and said terminal thereof which is opposite said one terminal thereof is a compensating thermistor, the characteristics of said compensating thermistor being such that it will not heat substantially in response to passage of said voltage and current waves therethrough.

9. The invention as claimed in claim 8, in which said compensating thermistor is such that the readings of said meter will remain substantially the same despite variations in the temperature of the medium to which said sensing thermistor and compensating thermistor are exposed.

10. The invention as claimed in claim 1, in which said other of said voltage and current waves is square-wave in nature, and has a duty cycle which corresponds to the power applied to sensing thermistor and which varies in response to the rate of heat transfer between said sensing thermistor and said medium, and in which said sensing and control means and said first-named means are responsive to the condition of the bridge to maintains said sensing thermistor at a temperature which is a fixed differential above the temperature of the medium to which said thermistor is exposed.

11. The invention as claimed in claim 1, in which the meter is coupled to said one leg of said bridge and the invention further includes means coupled to said meter for zero-suppressing said meter in order to provide the said meter with a particular reading corresponding to a predetermined condition of the medium to which said sensing thermistor is exposed, said predetermined condition being one at which there is no relative movement between said sensing thermistor and said medium.

12. The invention claimed in claim 1 wherein the sensing and control means includes a transistor providing an emitter to base junction from the terminal opposite the one adjacent terminal to the one adjacent terminal, the transistor having a turn-on voltage which tends to vary the frequency of oscillations of the one wave, and wherein the output circuit includes means for altering the turn-on voltage of the transistor to control the frequency of oscillations of the one wave.

13. The invention recited in claim 12 wherein the altering means includes:
a diode providing an anode to cathode junction from the one adjacent terminal to the terminal opposite the one adjacent terminal;
a resistance coupled to the cathode of the diode to alter the voltage drop across the diode; whereby the turn-on voltage of the transistor is altered to control the frequency of oscillations of the one wave.

14. The invention as claimed in claim 1 wherein:
said sensing and control means has regenerative characteristics for decreasing the time during which the one wave is changed from the datum level to the fixed D. C. level, and has degenerative characteristics for decreasing the time during which the one wave is changed from the fixed D. C. level to the datum level.

15. The invention recited in claim 1 wherein the datum level of the one wave has a magnitude of zero.

16. The invention recited in claim 1 wherein changes between the datum level and the fixed D. C. level occur at a substantially constant frequency.

17. The invention claimed in claim 16 wherein the sensing and control means includes a differential amplifier.

18. The invention recited in claim 17 wherein said second named means includes a unijunction oscillator.

19. An instrument for indicating the rate of flow of a medium, comprising:
a Wheatstone bridge having two input terminals and two output terminals,
a sensing thermistor disposed in the medium and connected in said bridge between said one input terminal and the other of said output terminals,
a first resistor connected in each bridge between said other output terminal and the other of said input terminals,
a second resistor connected in said bridge between said other input terminal and the other of said input terminals,
a third resistor connected in said bridge between said other input terminal and said one output terminal, means to form an input circuit including said input terminals,
said input circuit further including voltage means exterior to said bridge and having characteristics for providing voltage at one of a fixed D. C. level and a datum level,
means to form an output circuit including said output terminals,
said output circuit further including sensing and control means responsive to the condition of said bridge to change between said D. C. level and said datum level the voltage impressed on said bridge, and
an averaging ammeter associated with said thermistor and responsive to both the duty cycle and the magnitude of the current wave at said thermistor to provide an indication of power dissipated by said thermistor, the rate of heat transfer between said thermistor and the medium, and the rate of flow of the medium.

20. The invention as claimed in claim 19, in which said third resistor is a temperature-compensating thermistor disposed in said medium, the characteristics of said compensating thermistor being such that it does not heat substantially in response to said current wave.

21. The invention recited in claim 19 wherein said voltage means includes resistance means variable between limits corresponding to the fixed D. C. level and the datum levels.

22. The invention recited in claim 21 wherein said sensing and control means includes:

switching means responsive to an increasing voltage between the output terminals to provide a particular increasing current;

resistance means responsive to the particular increase in current to increase D. C. level impressed on the input terminals of the bridge;

the bridge responsive to the increased D. C. level on the input terminals to increase the voltage between the output terminals; whereby the D. C. level impressed on the input terminals is regenerated thereby decreasing the time during which the voltage wave changes from the datum level to the fixed D. C. level.

23. The invention recited in claim 19 wherein the sensing and control means has regenerative and degenerative characteristics which decrease the time during which changes are made between the fixed D. C. level and the datum level.

24. Apparatus for indicating heat-transfer rates, and thus flow or other variables, which comprises:

a sensing thermistor adapted to be disposed in heat-transfer relationship to a medium, a power source of the two factors, voltage and current, determining electrical power, said source supplying one of said two factors at a constant amplitude, a control source for generating a plurality of first control signals at a predetermined fixed frequency, first means responsive to the first control signals from said control source to cause said power source to apply said one factor to said thermistor, whereby the other of said two factors is also applied by said power source to said thermistor, differential amplifier means responsive to the temperature of said thermistor to terminate application of said one factor by said first means to said thermistor as soon as power from said power source has caused self-heating of said thermistor to a predetermined constant temperature differential above the temperature of said medium, whereby application of said other factor is also terminated, said application and subsequent termination of said other factor causing a pulse of said other factor to be applied to said thermistor, and second means responsive to the area of said pulse of said other factor and providing an output indicative thereof to indicate the rate of heat transfer from said thermistor to said medium.

25. The invention as claimed in claim 24, in which said one factor is voltage and said other factor is current.

26. The invention as claimed in claim 24, in which said control signal is characterized by a plurality of control spikes and said fixed frequency is such that each pulse of said other factor is initiated in response to each control spike from said control source, and is terminated prior to the next subsequent control spike from said control source.

27. The invention as claimed in claim 24, in which said second means is a galvanometer coupled to the sensing thermistor.

28. The invention claimed in claim 24 wherein the differential amplifier includes:

a first amplifier responsive to the temperature of said thermistor to provide a second control signal, and the first means responsive to the second control signal to maintain the application of the said one factor to said thermistor after the termination of each of said first control signals; and a second amplifier responsive to the temperature of said thermistor to provide a third control signal, the first amplifier responsive to the third control signal to terminate the second control signal and the first means responsive to the termination of the second control signal to teminate application of said one factor to said thermistor.

29. The invention claimed in claim 24 in which said control source includes a unijunction transistor.

30. The invention claimed in claim 24 wherein said pulse of said other factor is characterized by changes between a first D. C. level and a zero level.

* * * * *